(12) United States Patent
Bunn et al.

(10) Patent No.: US 6,314,056 B1
(45) Date of Patent: *Nov. 6, 2001

(54) FIBER OPTIC SENSOR SYSTEM AND METHOD

(75) Inventors: J. Brett Bunn; James S. Bunn; Mikko Jaaskelainen; Steven J. Maas, all of Austin, TX (US)

(73) Assignee: Petroleum Geo-Services, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,368

(22) Filed: Jan. 23, 1998

(51) Int. Cl.⁷ .............................. H04R 23/00; G01B 9/02
(52) U.S. Cl. ............................. 367/149; 356/345
(58) Field of Search .......................... 367/149; 356/345; 250/227.19

(56) References Cited

U.S. PATENT DOCUMENTS

| | | |
|---|---|---|
| 4,162,397 | 7/1979 | Bucaro et al. . |
| 4,390,974 | 6/1983 | Siems . |
| 4,525,818 | 7/1985 | Cielo et al. ............................ 367/149 |
| 4,648,083 | 3/1987 | Giallorenzi ............................ 367/149 |
| 4,799,202 | 1/1989 | Assard . |
| 4,799,752 | 1/1989 | Carome . |
| 4,959,539 | 9/1990 | Hofler et al. ..................... 250/227.19 |
| 5,155,548 | 10/1992 | Danver et al. . |
| 5,253,222 | 10/1993 | Danver et al. . |
| 5,256,237 | 10/1993 | Maas et al. . |
| 5,276,657 | 1/1994 | Newnham et al. ................... 367/157 |
| 5,285,424 | 2/1994 | Meyer . |
| 5,293,353 | * 3/1994 | Mestas et al. ........................ 367/157 |
| 5,305,333 | 4/1994 | Kaylor et al. . |
| 5,313,266 | 5/1994 | Keolian et al. . |
| 5,317,544 | 5/1994 | Maas et al. ........................... 367/149 |
| 5,361,130 | * 11/1994 | Kersey et al. ........................ 356/345 |
| 5,363,342 | 11/1994 | Layton et al. . |
| 5,394,377 | 2/1995 | vonBieren . |
| 5,394,378 | 2/1995 | Dandridge et al. . |
| 5,475,216 | 12/1995 | Danver et al. . |
| 5,497,233 | 3/1996 | Meyer . |
| 5,504,720 | 4/1996 | Meyer et al. . |
| 5,675,674 | 10/1997 | Weis . |
| 5,808,779 | * 9/1998 | Weis ..................................... 359/290 |

OTHER PUBLICATIONS

Brooker, John T., et al., Fiber Optic Sensor For Planar Array, U.S. Navy Journal of Underwater Acoustics, vol. 43, No. 2, (Apr. 1993).

(List continued on next page.)

*Primary Examiner*—Ian J. Lobo
(74) *Attorney, Agent, or Firm*—Arnold & Associates

(57) ABSTRACT

A system and method are provided for converting an electrical signal to an optical signal for a fiber optic system. The electrical signal produced by a sensor (10) based upon a parameter being measured is connected across a material (12, 34, 40) that changes dimension responsive to an applied electrical signal. An optical fiber (14, 30, 38) is coupled to the material (12, 34, 40) where dimension changes of the material (12, 34, 40) produce strain in the optical fiber (14, 30, 38). This strain is operable to affect light traveling through the optical fiber (14, 30, 38) to produce an optical signal for a fiber optic system. In one embodiment, the sensor (10) can be a geophone sensor that produces an electrical signal proportional to motion of the geophone sensor. In another embodiment, the sensor (10) can be a hydrophone sensor that produces an electrical signal proportional to acoustic pressure incident on the hydrophone sensor. Also, the material (12, 34, 40) that changes dimension responsive to an applied electrical signal can be, for example, a piezoelectric ceramic cylinder or a PVDF film or other piezo-polymer material.

41 Claims, 3 Drawing Sheets

OTHER PUBLICATIONS

Cielo, P.G., Fiber optic hydrophone: improved strain configuration and environmental noise protection, Applied Optics, vol. 18, No. 17, (Sep. 1, 1979).

Dandridge, Anthony, et. al., Overview of Mach–Zehnder Sensor Technology and Applications, Fiber Optic and Laser Sensors VI. Proc. SPIE vol. 985.

Goepel, Charles A., An Air–Backed Mandrel Fiber Optic Hydrophone, U.S. Navy Journal of Underwater Acoustics, vol. 43, No. 2, (Apr. 1993).

Hocker, G.B., Fiber–optic sensing of pressure and temperature, Optical Society of America, (1979).

McDearmon, Graham F., Theoretical Analysis of a PushPull Fiber–Optic Hydrophone, Journal of Lightwave Technology, vol. LT5, No. 5, (May, 1987).

Davies, D.E.N., et al., Electronics Letters, vol. 10(2), pp. 21–22 (Jan. 24, 1974).

D.A. Jackson, R. Priest, A. Dandridge, and A.B. Tveten, Elimination of Drift in a Single–Mode Optical Fiber Interferometer Using a Piezoelectrically Stretched Coiled Fiber (1980), pp. 287–290.

D.E.N. Davies, S. Kingsley, Method of Phase–Modulating Signals in Optical Fibres: Application to Optical–Telemetry Systems, (1974), pp. 285–286.

G. Martini, Analysis of a Single–Mode Optical Fibre Piezoceramic Phase Modulator, 1987, pp. 291–300.

M.N. Zervas and I.P. Giles, Optical–Fiber Phase Modulator with Enhanced Modulation Efficiency 1988), pp. 301–303.

M.N. Zervas and Robert C. Youngquist,, Subharmonics, Chaos, and Hysteresis in Piezoelectric Fibre–Optic Phase Modulators, (1986), pp. 304–307.

V.S. Sudarshanam and Richard O. Claus, Frequency Response and Phase–Shift Nonlinearity of a Cylindrical $PVF_2$–Film–Based Fiber–Optic Phase Modulator (1993), pp. 314–321.

Wei Jin, Li Ming Zhang, Deepak Uttamchandani, and Brian Culshaw, Modified $J_1 \ldots J_4$ Method for Linear Readout of Dynamic Phase Changes in a Fiber–Optic Homodyne Interferometer (1991), pp. 354–357.

* cited by examiner

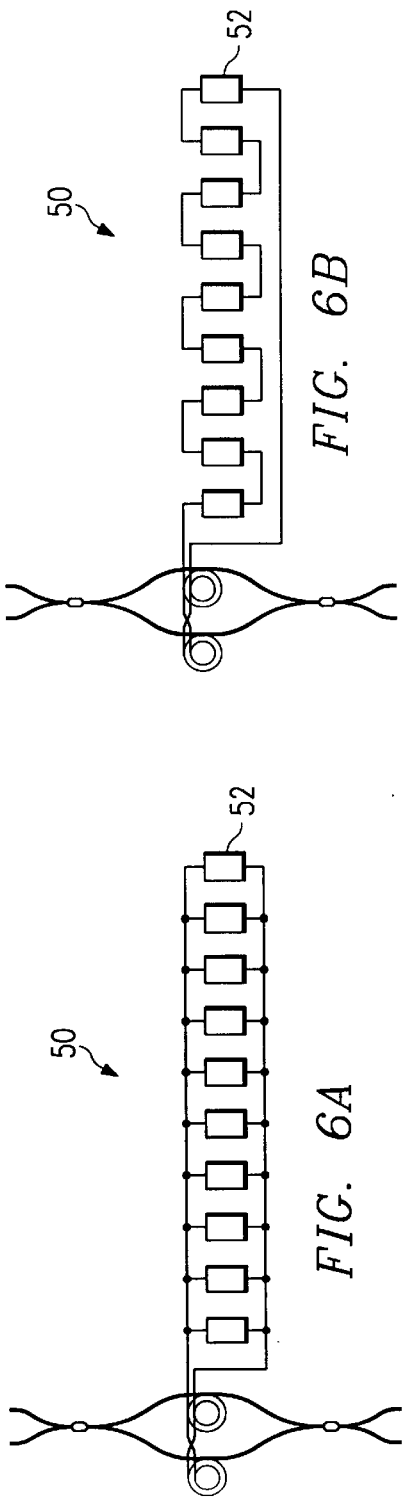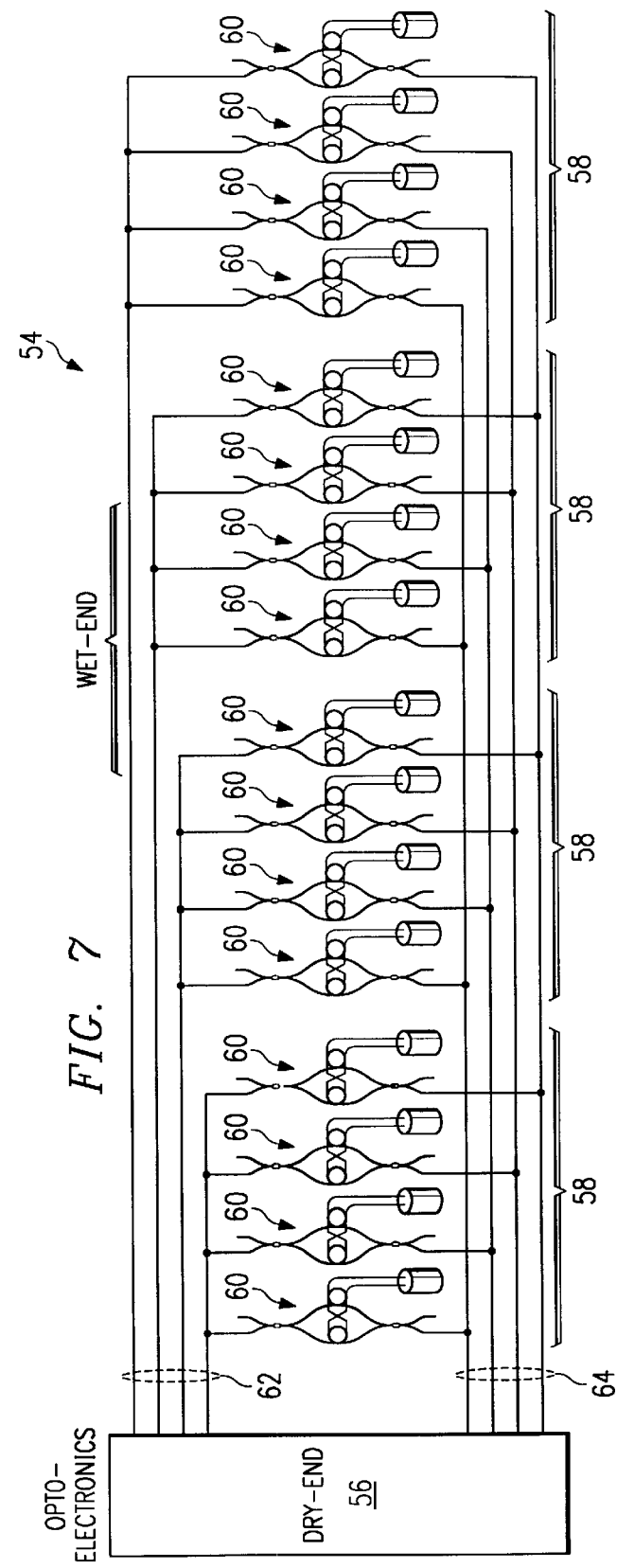

FIBER OPTIC SENSOR SYSTEM AND METHOD

TECHNICAL FIELD OF THE INVENTION

The present invention relates in general to the field of sensor arrays and, more particularly, to a fiber optic sensor system and method.

BACKGROUND OF THE INVENTION

Electrical geophones can be used to measure the velocity of a vibration by moving a coil of copper wire through a magnetic field based upon the vibration. This movement induces a voltage across the coil proportional to the movement which can be used to determine the velocity of the vibration. Analogously, a piezoelectrical ceramic or polyvinylideneflouride (PVDF) hydrophone sensor can create an electrical signal output that is proportional to sensed acoustic pressure. Traditionally, such sensors of the electrical type have required signal conditioning and preamplifying electronics near the sensing elements to be able to transmit the output signals to sensor array recording and processing equipment. These additional electronics can add significant complexity and cost to the outboard sensor suite.

The limitations of electrical sensor systems and improvements offered by a fiber optic system have been well documented. Further, the concept of using an optical fiber in sensing applications is not new. The U.S. Naval Research Laboratory (NRL) has been a leader in this area, and the NRL and others have disclosed a number of optical systems. For example, U.S. Pat. No. 4,648,083, issued to Gialorenzi, describes a typical fiber optic system. In this system, an optical phase equivalent to acoustic pressure in a hydrophone was measured. In addition, fiber optic vibration sensors have been disclosed by Hofler, Garrett and Brown of the Naval Post Graduate school. Common fiber optic sensors consist of coils of fiber wrapped around mandrels (see U.S. Pat. No. 4,525,818, issued to Cielo, et al.) or onto flexing disks (see U.S. Pat. No. 4,959,539, issued to Hofler, et al.). The coils are then attached to optical couplers to create an interferometer. In these conventional optical sensor systems, the physical phenomenon being measured is directly converted into a differential optical phase by acting on the interferometer. In other words, the acoustic pressures or vibrations stress the arms of the interferometer creating an optical phase shift in the interferometer. Some arrays require extended channel group lengths in order to achieve the required signal to noise ratio. In the case of a towed streamer array, a number of hydrophone elements (16 is common) are electrically connected together to create an output over an extended length. Optical versions of the extended group length have been described for example in U.S. Pat. No. 5,668,779, issued to Dandridge, et al. and U.S. Pat. No. 5,317,544, issued to Maas, et al. These extended interferometers are relatively complicated to fabricate and isolating only certain parts of the interferometer is difficult.

Another fiber optic sensor approach consists of fiber Bragg grating based sensors. The fiber Bragg gratings can be used in different manners to measure a given phenomenon. One method is to use the grating as a reflector, creating a Fabry-Perot interferometer. In this case, a similar change in phase of the light is measured. In a second method, the grating itself is the sensor, and strain on the grating changes the period of the grating which changes the wavelength of light reflected from the grating. This change in wavelength is proportional to the strain on the grating.

With either type of fiber optic sensor, sensor arrays can be significantly improved by the fiber optic telemetry. However, along the way, the sensors have become more complicated, and, in many cases, conventional fiber optic systems have yielded sensors with lower performance and/or higher cost.

SUMMARY OF THE INVENTION

In accordance with the present invention, a method and system for converting an electrical signal, such as the output of an electrical sensor or a summed group of electrical sensors, to an optical signal for a fiber optic system are disclosed that provide advantages over conventional sensor systems.

According to one aspect of the present invention, the electrical signal produced by a sensor based upon a parameter being measured is connected across a material that changes dimension responsive to an applied electrical signal. An optical fiber is coupled to the material where dimension changes of the material produce strain in the optical fiber. This strain is operable to affect light traveling through the optical fiber to produce an optical signal for a fiber optic system. In one embodiment, the sensor can be a geophone sensor that produces an electrical signal proportional to motion of the geophone sensor. In another embodiment, the sensor can be a hydrophone sensor that produces an electrical signal proportional to acoustic pressure incident on the hydrophone sensor. Also, the material that changes dimension responsive to an applied electrical signal can be, for example, a piezoelectric ceramic cylinder or a PVDF film or other piezo-polymer material.

A technical advantage of the present invention is that an electrical signal produced by a sensor can be converted to an optical signal for use in a fiber optic system.

Another technical advantage is that a laser controlled optical transmission and detection system can be used to replace signal conditioning and preamplifying components in use in conventional electrical sensor array systems. This can be accomplished by the conversion of electrical output signals from the sensors into optical phase signal information.

A further technical advantage of the present invention is that disadvantages of prior systems can be overcome by providing a telemetry system that combines the high performance and low cost of electrical sensors with the advantages offered by a passive optical telemetry system. The passive nature can eliminate many failures created in the active signal conditioning electronics or other optical configuration requiring electrical power in water.

Additional technical advantages of the present invention should be apparent from the drawings, description and claims.

BRIEF DESCRIPTION OF THE DRAWINGS

A better understanding of the present invention and advantages thereof may be acquired by referring to the following description taken in conjunction with the accompanying drawings, in which like reference numbers indicate like features, and wherein:

FIGS. 6A and 6B are diagrams of embodiments of summed groups of electrical sensors converted into interferometric phase; and FIG. 7 is a diagram of an array configuration of electrical sensors converted into interferometric phase.

DETAILED DESCRIPTION OF THE INVENTION

Figure 1:
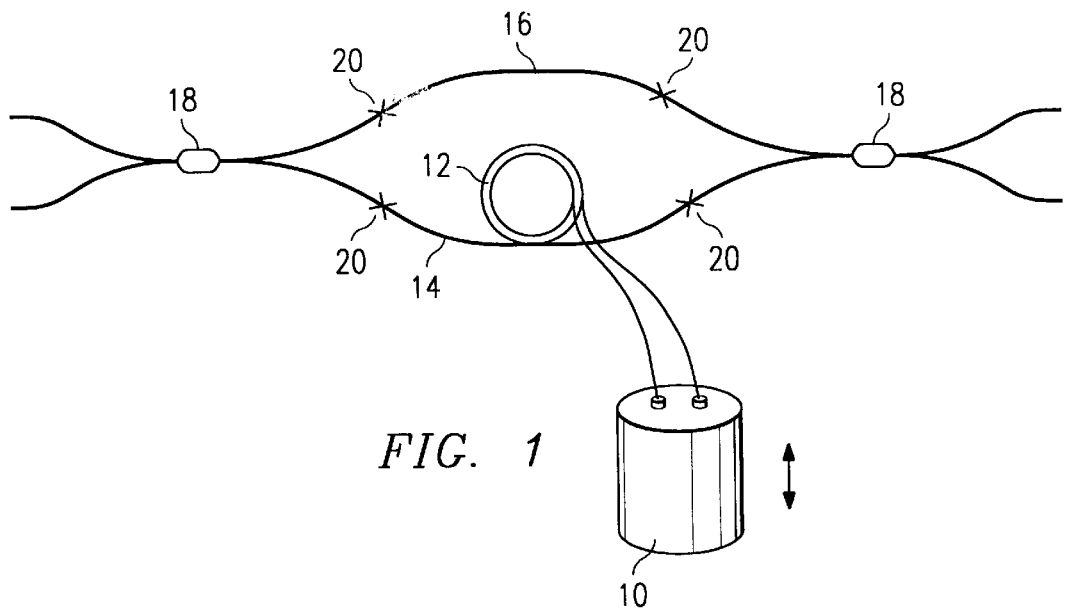
FIG. 1 is a diagram of one embodiment of a system using a Mach-Zehnder interferometer with one arm wrapped around a PZT to convert an electrical signal into differential interferometric phase.

FIG. 1 is a diagram of one embodiment of a system using a Mach-Zehnder interferometer with one arm wrapped around a PZT to convert an electrical signal, such as from an electrical sensor or a summed group of sensors, into differential interferometric phase. As shown, a sensor 10 creates a voltage output related to the parameter it is measuring, such as velocity or acoustic pressure. The output voltage is then placed across a material 12 that changes dimension (e.g., contracts and expands) responsive to the applied output voltage. An optical fiber 14 is wrapped around material 12, and optical fiber 14 is strained by the dimension change of material 12. The system also includes a reference optical fiber 16. To make an interferometer, optical couplers 18 can be fusion spliced, indicated at 20, to sensing optical fiber 14 and reference optical fiber 16, as shown.

In one implementation, sensor 10 in FIG. 1 can be a conventional geophone sensor. A geophone sensor can be used to measure the velocity of a vibration by moving a coil of copper wire through a magnetic field. This movement induces a voltage across the coil proportional to the movement. In this implementation, the voltage output from sensor 10 can be directly connected to a piezoelectric ceramic cylinder 12. Typically, a geophone used in seismic exploration applications produces a voltage output on the order of one volt peak to peak (although this can be varied by changing the number of turns of copper wire or the magnetic field). Applying this voltage across a standard piezoelectric ceramic cylinder (PZT) will induce, for example, an approximately 5 nm/volt change of the mean diameter of a PZT having a one inch diameter and a 0.05 inch thick wall. This change can be translated into a length change in optical fiber 14 of 4.75 πnm per turn. The number of turns may be varied to adjust the optical scale factor of the system. The relative phase change in an interferometer is given by the equation:

$$\Delta\phi = 2\pi \cdot n \cdot (\Delta l/\lambda),$$

where n is the index of refraction for the fiber and λ is the wavelength of the light.

According to the present invention, a fiber optic interferometer can be constructed with one arm wrapped around a piezoelectric cylinder 12 as shown in FIG. 1. In operation, output from electrical sensor 10 (e.g., a geophone) is connected across piezoelectric cylinder 12. The voltage output from electrical sensor 10 causes piezoelectric cylinder 12 to expand and contract, thus causing the sensing optical fiber 14 of the interferometer to expand and contract. This induces a phase change in the interferometer proportional to the parameter being measured by electrical sensor 12. The optical signal can then be multiplexed with optical signals from other sensors in an array according to conventional methods.

Figure 2:
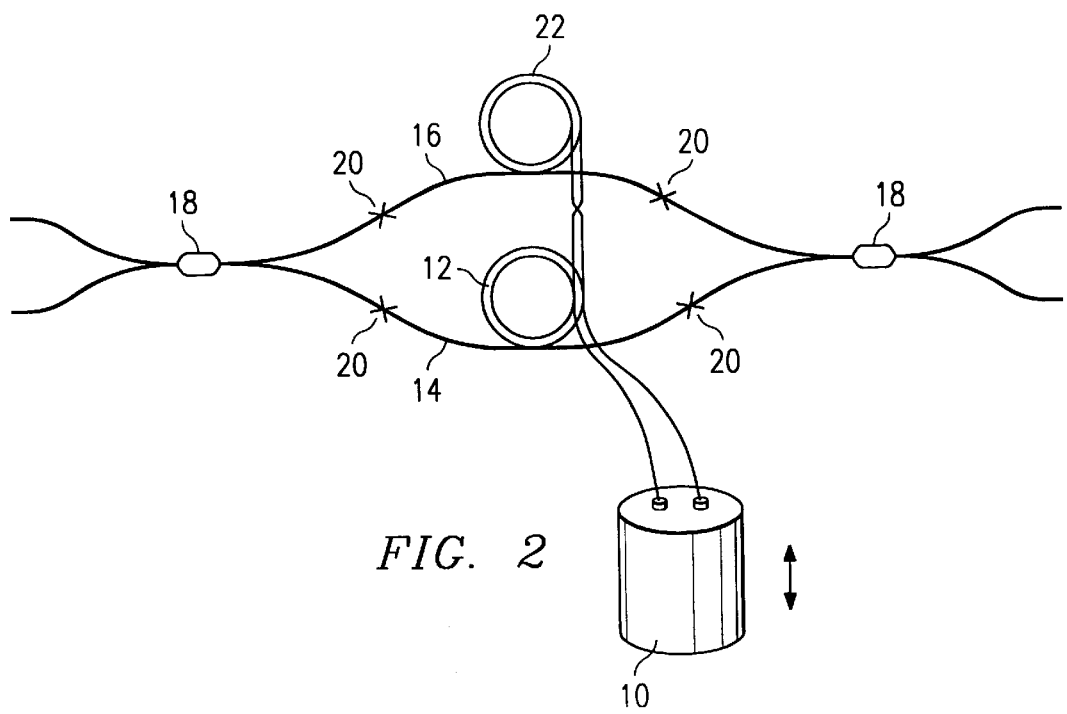
FIG. 2 is a diagram of one embodiment of a system using both arms of a Mach-Zehnder interferometer around separate PZT's connected with opposite polarities in a "push-pull" arrangement to convert electrical signals into differential interferometric phase.

FIG. 2 is a diagram of one embodiment of a system using both arms of a Mach-Zehnder interferometer around separate PZT's connected with opposite polarities in a "push-pull" arrangement to convert electrical signals into differential interferometric phase. In contrast to the system of FIG. 1, a second material 22 that changes dimension responsive to an applied output voltage is used and is connected to the output voltage of sensor 10 in an opposite polarity as material 12 such that material 22 mirrors material 12. Material 22 can, for example, be a piezoelectric ceramic cylinder (PZT) like that discussed above. By winding reference fiber 16 on material 22 and connecting materials 12 and 22 with opposite polarities, fiber 16 is caused to contract when fiber 14 expands and vice versa. With this structure, the system of FIG. 2 provides a push-pull configuration for converting the electrical output of sensor 10 into optical signals which can be used to increase the scale factor by a factor of two.

Figure 3:
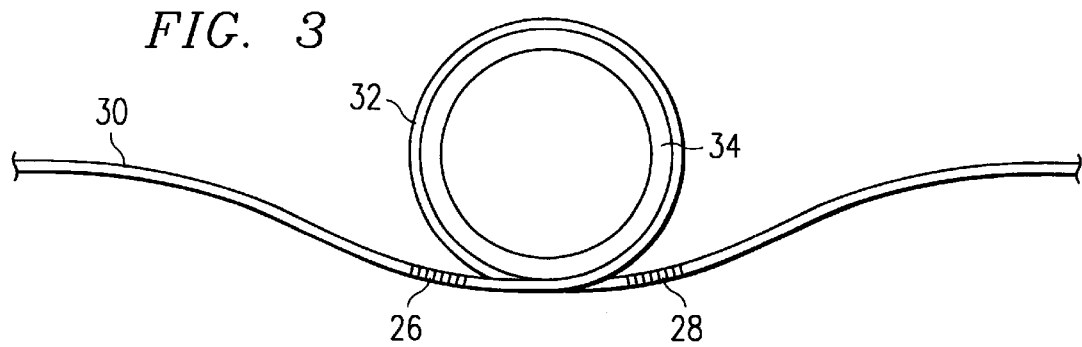
FIG. 3 is a diagram of one embodiment of a system using fiber Bragg gratings in a Fabry-Perot interferometer wrapped around a PZT to convert an electrical signal into differential interferometric phase.
Figure 4:
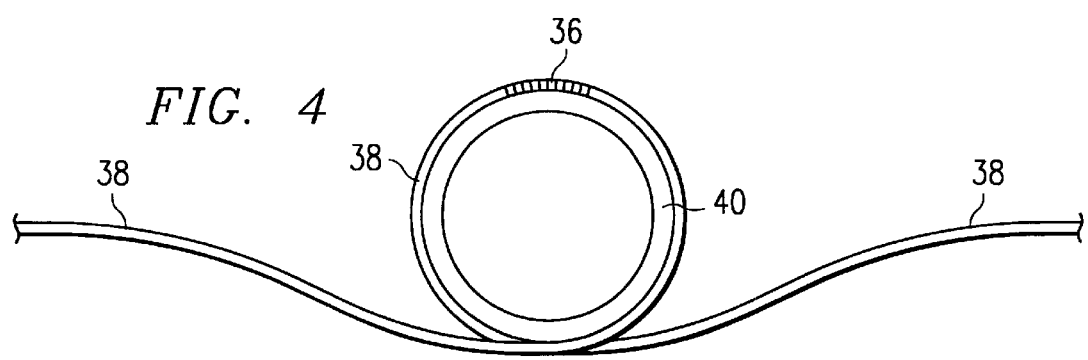
FIG. 4 is a diagram of one embodiment of a system using a single fiber Bragg grating wrapped around a PZT to convert an electrical signal into varying optical wavelength information.

FIGS. 3 and 4 demonstrate configurations for an alternate approach that includes the addition of fiber Bragg gratings to the signal conversion concept. FIG. 3 is a diagram of one embodiment of a system using fiber Bragg gratings in a Fabry-Perot interferometer wrapped around a PZT to convert electrical sensor output into differential interferometric phase according to the present invention. As shown, a Fabry-Perot interferometer is created between two reflecting fiber Bragg gratings 26 and 28. Light traveling down optical fiber 30 is partially reflected by the first grating 26. The light continues down optical fiber 32 which is wrapped around the PZT cylinder (or other electro-sensitive material) 12 to the next grating 28 where the light is reflected back. A voltage across the PZT 12 produced by a sensor 10 (not shown in FIG. 3) induces a phase change between the signals reflected back from gratings 26 and 28. Thus, the system of FIG. 3 uses gratings 26 and 28 as reflectors, creating a Fabry-Perot interferometer.

In general, a fiber containing gratings for the Fabry-Perot interferometer can be wrapped around a PZT cylinder or other electro-sensitive material such that the two gratings are positioned on each side of the cylinder. The optical fiber between the gratings is stressed responsive to an electrical sensor output which causes a change in phase of the light measured between the signals reflected from the two gratings.

FIG. 4 is a diagram of one embodiment of a system using a single fiber Bragg grating wrapped around a PZT to convert electrical sensor output into varying optical wavelength information according to the present invention. As shown, an optical fiber 38 with an integral fiber Bragg grating 36 is attached to a material 15 that changes dimension responsive to a voltage output across material 40 (e.g., PZT) from a sensor 10 (not shown in FIG. 4). The voltage output from sensor 10 applied across material 40 induces a stress in grating 36. This stress causes the period of grating 36 to change, which in turn causes the wavelength of light reflected back from grating 36 to change. This change in wavelength is proportional to the voltage output from sensor 10. Thus, in operation, grating 36 is the sensor for converting to an optical signal from the original output voltage of sensor 10.

Figure 5:
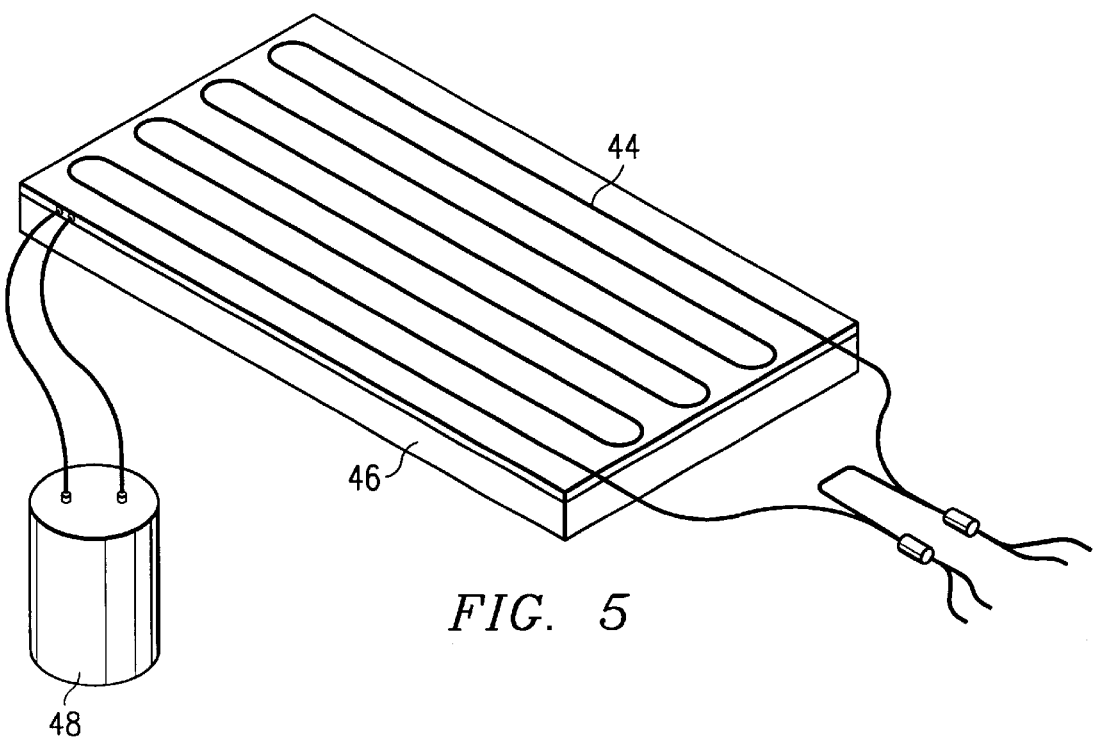
FIG. 5 is a diagram of one embodiment of a system using a Mach-Zehnder interferometer with one arm attached to a PVDF film to convert an electrical signal into differential interferometric phase.

Although the above embodiments use a piezoelectric cylinder (PZT) to induce strain in the optical fiber, this PZT could be replaced by a PVDF film or other material with dimension change or other electro-sensitive characteristics. FIG. 5 is a diagram of one embodiment of a system using a Mach-Zehnder interferometer with one arm attached to a PVDF film to convert electrical sensor output into differential interferometric phase according to the present invention. As shown, the PZT cylinder 12 of FIG. 1 is replaced with a PVDF film 46 (or other material). An optical fiber 44 is attached to material 46, and the electrical output from a sensor 48 is applied across material 46. The electrical output of sensor 48 induces a responsive change in material 46 which in turn induces stress into optical fiber 44. In addition to laying flat as shown in FIG. 5, material 46 could be wrapped around a mandrel or placed in other configurations as appropriate for the desired application. Further, other types of interferometers could be used, such as a Michelson interferometer, in addition to the ones described above.

FIGS. 6A and 6B are diagrams of embodiments of summed groups of electrical sensors. As shown in FIG. 6A, a sensor 50 can include a group of electrical sensors or sensing elements 52 that are connected in parallel. Similarly, as shown in FIG. 6B, sensor 50 can include a group of electrical sensors or sensing elements 52 that are connected in series. In the case of a towed streamer, a group of sixteen sensing elements 52 are typically connected together over a 12.5 meter array length to form one electrical signal output. This is common with other sensor types as well, although the group is often referred to as a single element.

FIG. 7 is a diagram of an array configuration of electrical sensors. The array configuration has a wet-end portion 54 (where the array is placed in water) and a dry-end portion 56. Dry-end portion 56 can contain opto-electronics for processing optical signals. The array configuration of FIG. 7 includes four sensor sub-groups 58 that each contain four sensors 60. Sensors 60 can be single sensors or groups of sensors (e.g., as shown in FIGS. 6A and 6B). Sensors 60 are connected to outgoing optical signals 62 and provide incoming optical signals 64. In the illustrated arrangement, each sensor 60 in a group 58 is connected to the same outgoing optical signal 62. Also in this arrangement, each sensor 60 in a group 58 is connected to a different line for providing incoming optical signals 64. This arrangement is essentially a frequency division multiplexed telemetry, for example like that shown and described in U.S. Pat. No. 4,648,083, issued to Gialorenzi. However, various other optical telemetries could be used to power an array of N channels.

Although the present invention has been described in detail, it should be understood that various changes, substitutions and alterations can be made thereto without departing from the spirit and scope of the invention as defined by the appended claims.

What is claimed is:

1. A system for converting an electrical signal to an optical signal for a fiber optic system, comprising:
   a sensor that produces an electrical signal based upon a parameter being measured;
   a material that changes dimensions responsive to an applied electrical signal, the electrical signal produced by the sensor connected across the material; and
   an optical fiber coupled to the material, where dimension changes of the material produce strain in the optical fiber;
   the strain operable to affect light traveling through the optical fiber to produce an optical signal for a fiber optic system;
   wherein the optical fiber is part of an optical interferometer and strain produced in the optical fiber creates a phase change in the interferometer.

2. The system of claim 1, wherein the sensor is a geophone sensor that produces a voltage output proportional to motion of the geophone sensor.

3. The system of claim 1, wherein the sensor is a hydrophone sensor that produces a voltage output proportional to acoustic pressure incident on the hydrophone sensor.

4. The system of claim 1, wherein the sensor comprises a group of sensing components connected together to produce the electrical signal.

5. The system of claim 1, wherein the material is a piezoelectric ceramic cylinder.

6. The system of claim 1, wherein the material is a PVDF film.

7. The system of claim 1, wherein the material is a piezo-polymer material.

8. The system of claim 1, further comprising:
   a second material that changes dimension responsive to an applied voltage, the voltage output of the sensor connected across the second material in an opposite polarity; and
   a second optical fiber coupled to the second material, where dimension changes of the second material produces strain in the second optical fiber;
   the voltage output of the sensor thereby producing opposite dimension changes in the optical fibers.

9. The system of claim 8, wherein the interferometer is a Mach-Zehnder interferometer.

10. The system of claim 8, wherein the interferometer is a Michelson interferometer.

11. The system of claim 8, wherein the interferometer is a Fabry-Perot interferometer.

12. The system of claim 11, wherein the interferometer is a Fabry-Perot interferometer constructed using Bragg gratings as reflectors.

13. The system of claim 1, wherein the optical fiber has an integral Bragg grating with the Bragg grating coupled to the material, and wherein strain produced in the optical fiber causes a period of the Bragg grating to change which changes the wavelength of light reflected by the Bragg grating.

14. The system of claim 1, wherein the optical signal is multiplexed with other optical signals from a sensor array using frequency division multiplexing techniques.

15. The system of claim 1, wherein the optical signal is multiplexed with other optical signals from a sensor array using wavelength division multiplexing techniques.

16. The system of claim 1, wherein the optical signal is multiplexed with other optical signals from a sensor array using time division multiplexing techniques.

17. The system of claim 1, wherein the optical signal is multiplexed with other optical signals from a sensor array using a hybrid of frequency division multiplexing, wavelength division multiplexing and time division multiplexing techniques.

18. The system of claim 1, wherein said sensor further comprises a plurality of sensors electrically arranged in parallel.

19. The system of claim 1, wherein said sensor further comprises a plurality of sensors electrically arranged in series.

20. A system for converting an electrical signal to an optical signal for a fiber optic system, comprising:
   a sensor that produces an electrical signal based upon a parameter being measured;

a material that changes dimension responsive to an applied electrical signal, the electrical signal produced by the sensor connected across the material; and an interferometer wherein dimension changes of the material cause a mirror to move and cause a change in the intensity of the optical signal reflected.

21. The system of claim 20, wherein dimension changes of the material cause the mirror to move and cause a change in the phase of the optical signal reflected.

22. A method for converting an electrical signal to an optical signal for a fiber optic system, comprising:

connecting an electrical signal produced by a sensor based upon a parameter being measured across a material that changes dimension responsive to an applied electrical signal;

coupling an optical fiber to the material where dimension changes of the material produce strain in the optical fiber; and producing an optical signal for a fiber optic system from the effect of the strain in the optical fiber on light traveling through the optical fiber;

wherein the optical fiber is part of an optical interferometer and strain produced in the optical fiber creates a phase change in the interferometer.

23. The method of claim 22, wherein the sensor is a geophone sensor that produces an electrical signal proportional to motion of the geophone sensor.

24. The method of claim 22, wherein the sensor is a hydrophone sensor that produces an electrical signal proportional to acoustic pressure incident on the hydrophone sensor.

25. The method of claim 22, wherein the sensor comprises a group of sensing components connected together to produce the electrical signal.

26. The method of claim 22, wherein the material is a piezoelectric ceramic cylinder.

27. The method of claim 22, wherein the material is a PVDF film.

28. The method of claim 22, wherein the material is a piezo-polymer material.

29. The method of claim 22, further comprising:

connecting the output voltage of the sensor in an opposite polarity across a second material that changes dimension responsive to an applied voltage; and coupling a second optical fiber to the second material where dimension changes of the second material produces strain in the second optical fiber;

the voltage output of the sensor thereby producing opposite dimension changes in the optical fibers.

30. The method of claim 29, wherein the interferometer is a Mach-Zehnder interferometer.

31. The method of claim 29, wherein the interferometer is a Michelson interferometer.

32. The method of claim 29, wherein the interferometer is a Fabry-Perot interferometer.

33. The method of claim 32, wherein the interferometer is a Fabry-Perot interferometer constructed using Bragg grating as reflectors.

34. The method of claim 22, wherein the optical fiber has an intergral Bragg grating with the Bragg grating coupled to the material, and wherein strain produced in the optical fiber causes a period of the Bragg grating to change which changes the wavelength of light reflected by the Bragg grating.

35. The method of claim 22, further comprising multiplexing the optical signal with other optical signal from a sensor array using frequency division multiplexing techniques.

36. The method of claim 22, further comprising multiplexing the optical signal with other optical signals from a sensor array using wavelength division multiplexing techniques.

37. The method of claim 22, further comprising multiplexing the optical signal with other optical signal from a sensor array using time division multiplexing techniques.

38. The method of claim 22, wherein the senor further comprises a plurality of sensor electrically arranged in parallel.

39. The method of claim 22, wherein the sensor further comprises a plurality of sensor electrically arranged in series.

40. A method for converting an electrical signal to an optical signal for a fiber optic system, comprising:

connecting an electrical signal produced by a sensor based upon a parameter being measured across a material that changes dimension responsive to an applied electrical signal; and coupling an interferometer to the material where dimension change of the material cause a mirror to move and cause a change in intensity of the optical signal reflected.

41. The method of claim 40, wherein dimension changes of the material cause the mirror to move and cause a change in the intensity of the optical signal reflected.

* * * * *